United States Patent [19]

Jacobsohn

[11] Patent Number: 5,917,816
[45] Date of Patent: Jun. 29, 1999

[54] CENTRALIZED INTERWORKING FUNCTION FOR A MOBILE RADIO NETWORK

[75] Inventor: Dieter Jacobsohn, Murr, Germany

[73] Assignee: Alcatel Alsthom Compagnie Generale d'Electricite, Paris, France

[21] Appl. No.: 08/743,634

[22] Filed: Nov. 4, 1996

[30] Foreign Application Priority Data

Nov. 7, 1995 [DE] Germany ............................ 195 41 398

[51] Int. Cl.$^6$ .................................................. H04L 12/46
[52] U.S. Cl. ............................................. 370/352; 370/466
[58] Field of Search ...................................... 370/310, 352, 370/401, 402, 328, 338, 465, 466, 349; 455/422, 445; 375/222

[56] References Cited

U.S. PATENT DOCUMENTS

| | | | |
|---|---|---|---|
| 5,502,752 | 3/1996 | Averbuch et al. | 375/356 |
| 5,533,019 | 7/1996 | Jayapalan | 370/352 |
| 5,590,133 | 12/1996 | Billstrom et al. | 370/332 |
| 5,619,550 | 4/1997 | Averbuch et al. | 370/249 |

FOREIGN PATENT DOCUMENTS

| | | |
|---|---|---|
| 3808647 | 3/1990 | Germany . |
| 4221474 | 10/1992 | Germany . |
| 4304195 | 8/1994 | Germany . |
| 9508900 | 3/1995 | WIPO . |
| 9516330 | 6/1995 | WIPO . |

OTHER PUBLICATIONS

Gauldin, Mark A: The 5ESS Wireless Mobile Switching Center. In: AT & T Technical Journal Jul./Aug. 1993. pp. 38–47.

"The GSM" published in 1992 by M. Mouly and M.B. Pautet, pp. 102 and 149–154.

"Data Transmission in Digital Mobile Radio Networks" by R. Hinz, pp. 37–40 of the magazine telekom Praxis, vol. 72, Aug. 1995.

*Primary Examiner*—Chau Nguyen
*Attorney, Agent, or Firm*—Milton Oliver; Ware, Fressola, Van Der Sluys & Adolphson LLP

[57] ABSTRACT

During data transmissions between a mobile radio network and a telecommunications network, in order to adapt the data signals to the protocols and modulation rates used by said networks, adaptation processors which perform so-called interworking functions are used which are either implemented in each mobile station of the mobile radio network, or which are implemented in a centralized interworking function that is connected to several mobile switching centers. A centralized interworking function (CIWF) is described for the simple construction of a mobile radio network, which contains different interworking functions (IWF1, . . . , IWFn) for adapting data transmissions between several mobile switching centers (MSC) and different data transmission nodes (MOD, PH, PAD, ISDN) of a telecommunications network (PSTN), and contains a controlled switching network (SWT) which selectively connects the different interworking functions to the mobile switching centers. This technique provides a centralized installation in the mobile radio network, whereby each of the mobile switching centers has access to each of the different interworking functions. In this way all the interworking functions need not to be repeatedly installed, but only as many as are needed for the average load of the available data services.

9 Claims, 2 Drawing Sheets

CENTRALIZED INTERWORKING FUNCTION FOR A MOBILE RADIO NETWORK

TECHNICAL FIELD

The invention concerns a centralized interworking function for a mobile radio network and a mobile radio network which is equipped therewith.

BACKGROUND OF THE INVENTION

Interworking functions for the Global System for Mobile Communications (GSM) are known from pages 102 and 149–154 of the book "The GSM" published in 1992 by M. Mouly and M.-B. Pautet through their own publishing company, 49 rue Louise Bruneau, 91120 Palaiseau, France. The adaptation means described therein carry out so-called "Interworking Functions" in order to adapt the data signals of data transmissions between the mobile radio network and a telecommunications network to the protocols and modulation rates used in these networks. Accordingly the adaptation means which carry out the "Interworking Functions" are used for the reciprocal adaptation of different data transmissions. The third paragraph on page 149 of the book "The GSM" describes for example that these "Interworking Functions" can be implemented in any mobile radio station. It furthermore describes that the "Interworking Functions" can be implemented in a centralized interworking function which is connected to several mobile radio switching centers. It does not describe the structure of the mobile radio network identified as a "centralized approach".

These adaptation means identified as "Interworking Functions" are furthermore known from the article "Data Transmission in Digital Mobile Radio Networks" by R. Hinz, which appeared on pages 37–40 of the magazine "telekom praxis", volume 72, August 1995, published by Schiele and Schön, Berlin. Although it describes different adaptation means, an integration of these in a centralized interworking function is however not described therein.

SUMMARY OF THE INVENTION

The task of the invention is to present a centralized interworking function for the simple construction of a mobile radio network with the above-named structure.

The task is fulfilled by a centralized interworking function for a mobile radio network, comprising different interworking functions for providing interworking between the mobile radio network and different data transmission nodes of a telecommunications network, said centralized interworking function being connected to a number of mobile switching centers which establish data links between the mobile radio network and the telecommunications network, characterized by a switching network and at least one control unit connected thereto which permit any of the interworking functions to be connected to any of the mobile switching centers so as to selectively switch individual ones of the interworking functions into individual ones of the data links.

The task is also fulfilled by a mobile radio network comprising a centralized interworking function containing different interworking functions for providing interworking between the mobile radio network and different data transmission nodes of a telecommunications network, said centralized interworking function being connected to a number of mobile switching centers which establish data links between the mobile radio network and the telecommunications network, characterized in that the centralized interworking function comprises a switching network and at least one control unit connected thereto which permit any of the interworking functions to be connected to any of the mobile switching centers so as to selectively switch individual ones of the interworking functions into individual ones of the data links.

Accordingly the centralized interworking function is connected to several switching centers of the mobile radio network, which establish data links between the mobile radio network and a telecommunications network. The centralized interworking function contains different means for adapting the mobile radio network to different data transmission nodes of the telecommunications network, as well as a switching network and at least one controller connected thereto, whereby any of the interworking functions can be connected to any of the mobile switching centers for the selective switching of individual interworking functions to individual data links.

Thus the centralized interworking function contains different means for adapting the data transmissions between several switching centers of a mobile radio network and different data transmission nodes of a telecommunications network, as well as a controlled switching network which selectively connects the different interworking functions to the mobile switching centers.

This provides an installation in the mobile radio network whereby any of the mobile switching centers has access to any of the different interworking functions. In this way not all interworking functions need to be installed repeatedly, i.e. separately in each of the mobile switching centers. The centralized interworking function only needs to make as many interworking functions available as are required for an average load of the available data services. The centralized interworking function of the invention is very cost-effective and simple to construct, for example by making use of switching equipment modules which already comprise a switching network.

BRIEF DESCRIPTION OF THE DRAWINGS

The invention is described in the following by means of a configuration example with the help of two figures in which.

BEST MODE FOR CARRYING OUT THE INVENTION

Figure 1:
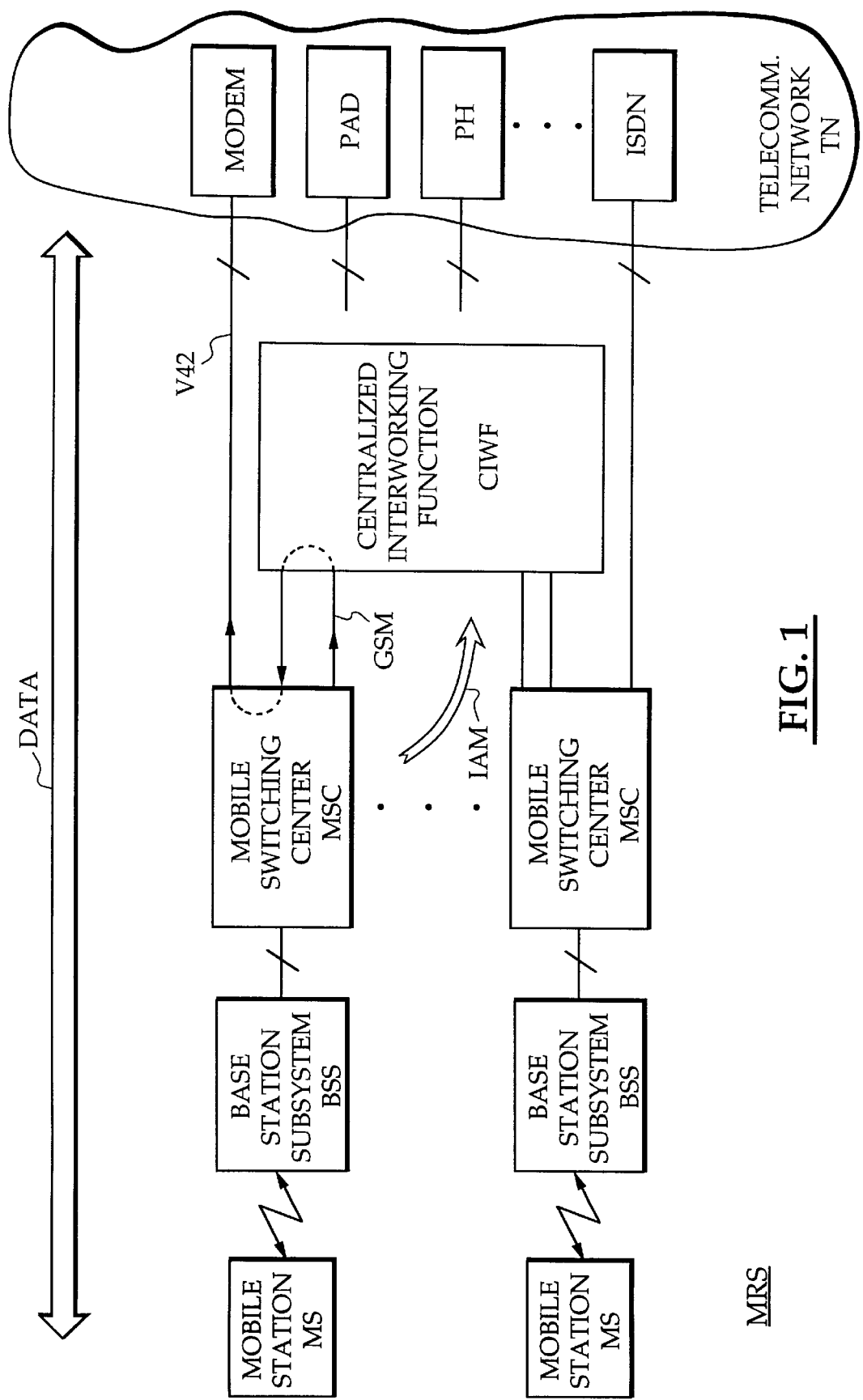
FIG. 1 schematically illustrates the structure of a mobile radio network with a centralized data link equipment.

FIG. 1 schematically illustrates the structure of a mobile radio network MRS with a centralized interworking function CIWF and with several mobile switching centers connected thereto, which establish data links DATA to a telecommunications network TN. The mobile radio network furthermore contains several base station subsystems BSS which are connected to the mobile switching centers MSC. The base station subsystems comprise base station controllers with base stations connected thereto, which are not illustrated. Each base station subsystem BSS supplies a partial area of the mobile radio network MRS, a so-called radio cell cluster. Mobile radio stations MS which move within the mobile radio network are wirelessly connected to the base stations of the base station subsystems BSS.

To transmit data between such a mobile station MS and a subscriber set of the telecommunications network TN, a data transmission connection, hereafter also called DATA link, is established via the mobile switching center MSC, from the mobile station MS to a data transmission node of the telecommunications network. In this case, the data transmission node also includes a subscriber station equipped with a modem. FIG. 1 for example illustrates four different data transmission nodes, where a first MOD represents a modem for a personal computer, a second PAD represents a so-called packet assembler-disassembler according to the V.24 standard, a third PH represents a so-called packet handler according to the X.25 standard, and a fourth ISDN represents a data transmission node for access to the ISDN network. For example, if a mobile radio subscriber wants to send an E-MAIL message via his mobile station MS by means of the data transmission service to a subscriber of the telecommunications network TN, a data transmission connection is established to the modem MOD and to the linked personal computer of the subscriber. In the example of FIG. 1, the mobile radio network is a cellular mobile radio network configured according to the GSM standard. Therefore the data transmission assigned to the mobile radio network is carried out in accordance with a GSM protocol, the so-called radio link protocol, and is adapted by one of the interworking functions to a data transmission specified by the CCITT standard V.42. These different protocols are used to correct errors and for data security, and are designated GSM and V.42 in FIG. 1. The adaptation of the data transmission and the establishment and disconnection of the link is described further by means of FIG. 2.

Figure 2:
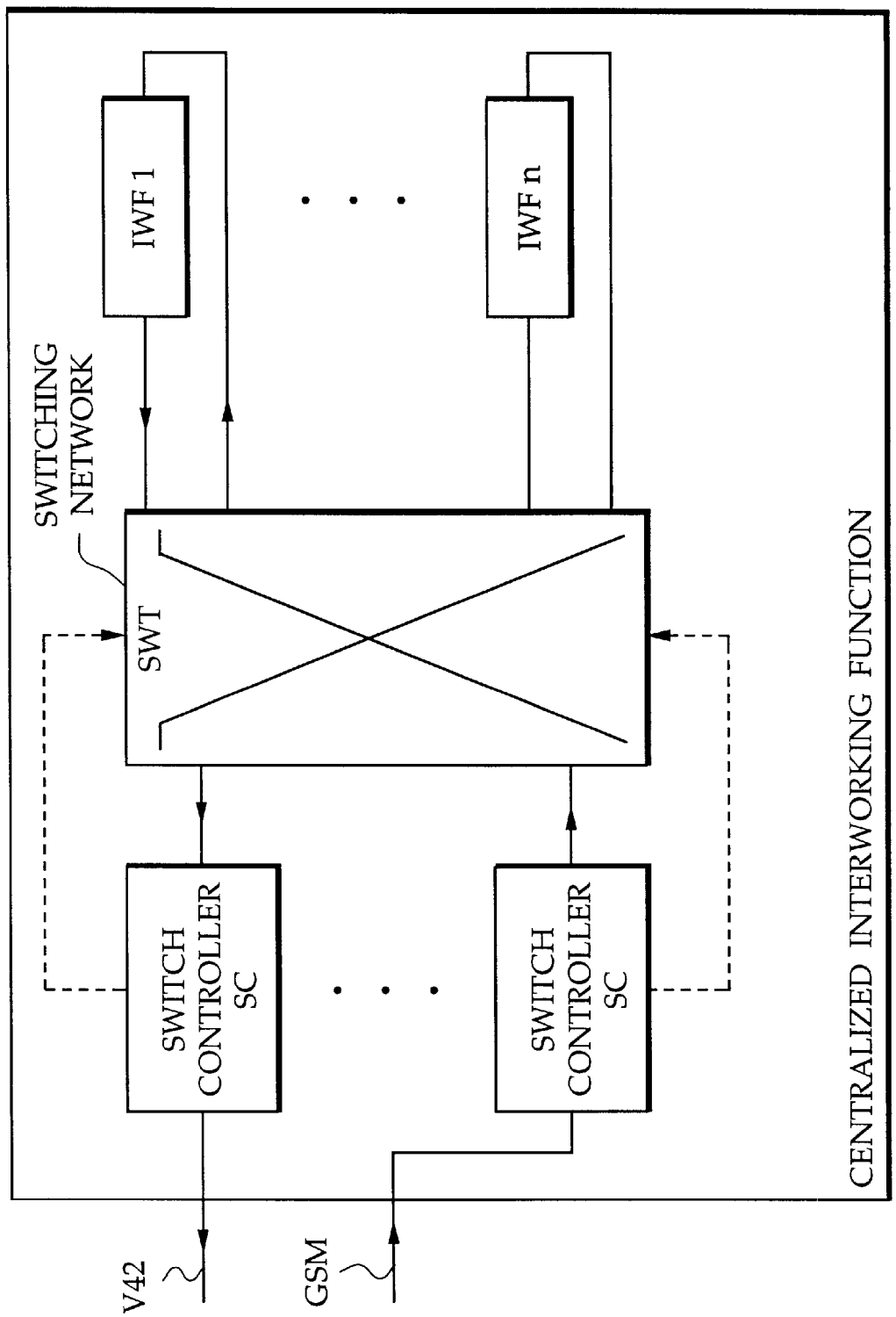
FIG. 2 is the block diagram of the centralized data link equipment.

FIG. 2 schematically illustrates the centralized interworking function CIWF. It contains different interworking functions IWF1 to IWFn. In this example one interworking function is provided for each of the four data transmission nodes. However only two interworking functions are represented for simplification purposes: a first interworking function IWF1 for a connection with a modem MOD and a second interworking function IWFn for a connection with the data transmission node ISDN. The centralized interworking function CIWF furthermore contains a switching network SWT that is linked to the interworking functions and is connected to switch controllers SC, which control the switching network SWT in a way so that selective connections can be established between the mobile switching centers and the interworking functions. This enables a connection between each mobile switching center and each data transmission node, where the transmission of data between the mobile radio network and the telecommunications network is adapted by the respective interworking function to the requirements of the data transmission node. No further explanation of the basic operating mode of the different interworking functions is provided in this instance, but reference is made to the article by R. Hinz cited earlier.

To carry out the above cited E-mail data service, the transmission of data from the mobile station is supplied to the centralized interworking function CIWF via the corresponding base station subsystem BSS and the mobile switching center MSC connected thereto. The signalling messages IAM, which are sent to a centralized interworking function CIWF by this mobile switching center MSC in accordance with the GSM protocol, are evaluated by one of the controllers CC that controls the switching network in a way so that the data transmission is supplied to the interworking function IWF1. This interworking function adapts the data signals, which are formulated in accordance with the GSM protocol, to the V.42 protocol required by the modem MOD.

Each of the interworking functions IWF1 to IWFn comprises a processor-controlled circuit which in each instance performs one of the above-cited interworking functions. In this example, the first interworking function IWF1 evaluates the data signals arriving from the mobile radio network, converts the modulation rate from 9600 bit/s to 14,400 bit/s, and modulates the incoming data signals from the mobile radio network. Incoming data from the telecommunications network TN are demodulated in reverse order and adapted to the lower modulation rate. Accordingly the interworking function operates bidirectionally and comprises a modem function in order to convert the digital data signals transmitted via the mobile radio network into analog acoustic signals for transmission through the telecommunications network.

Selective connections can be established with the above-described switching network SWT and the switch controllers SC connected thereto, so that each mobile switching center MSC, and therefore each mobile station MS of the mobile radio network, has access to every interworking function IWF1 to IWFn. Since in a period of time, on average, only a limited number of subscribers (about 10%) demand use of a data transmission service at the same time, only a limited number of interworking means need to be provided in the central data transmission installation CIWF. This allows a mobile radio network to be established in a cost-effective manner. In addition it is possible to use modules to build the centralized interworking function IWF1, such as have already been developed for a conventional switching center such as the "System 12" by Alcatel, and which already contain a switching network and the necessary controllers.

Several controllers can be used for a decentralized control of the switching network, as well as a single controller for a centralized control.

At first, a data link cannot only be looped back to the mobile switching centers, as described above, before it is supplied to the telecommunications network. It can also be envisioned to supply the data transmission from the mobile radio stations to the centralized interworking function, and from there directly to the telecommunications network. Furthermore, an integration of the centralized interworking function into one of the mobile switching centers can be imagined.

The above-described example is only one configuration of the invention whereby a mobile radio network is adapted to a telecommunications network. The described interworking functions are used to adapt a GSM data transmission to the transmission of data in a base station network within the framework of the E-mail data transmission service. But many other examples can be envisioned, such as the adaptation to data transmission nodes for fax services, dual voice and data services or so-called HSCD (High Switched Data) services. Applications of the invention can furthermore be projected whereby different mobile radio networks, particularly cellular mobile radio networks of different standards, can be adapted to each other.

What is claimed is:

1. A centralized interworking function (CIWF) for a mobile radio network (MRS), comprising different interworking functions (IWF1 to IWFn) for providing interworking between the mobile radio network (MRS) and different data transmission nodes (MOD, PAD, PH, ISDN) of a telecommunications network (TN), said centralized interworking function (CIWF) being connected to a number of mobile switching centers which establish data links (DATA) between the mobile radio network (MRS) and the telecommunications network (TN), wherein the central interworking function makes available, to a subscriber, conversion between a mobile radio protocol and an analog modulation (MOD) protocol, between a mobile radio protocol and a packet assembler/disassembler (PAD) protocol, between a mobile radio protocol and a packet handler (PH) protocol, and between a mobile radio protocol and an Integrated Services Digital Network (ISDN) protocol, by means of a switching network (SWT) and at least one switching control unit (SC) connected thereto, which permit any of the interworking functions (IWF1 to IWFn) to be connected to any of the mobile switching centers (MSC) so as to selectively interpose individual ones of the interworking functions in individual ones of the data links (DATA).

2. A centralized interworking function (CIWF) as claimed in claim 1, characterized in that at least one of the different interworking functions (IWF1) adapts a transmission rate available on a data channel of the mobile radio network (MRS) to a transmission rate available on a data channel of the telecommunications network (TN).

3. A centralized interworking function (CIWF) as claimed in claim 1, wherein at least one of the different interworking functions (IWF1) adapts said mobile radio protocol usable in the mobile radio network to said analog modulation protocol usable in the telecommunications network.

4. A centralized interworking function (CIWF) as claimed in claim 3, characterized in that the at least one interworking function (IWF1) adapts data signals to be transmitted between the mobile radio network (MRS) and the telecommunications network (TN) to the different communication protocols and transmission rates specified for the provision of a data transmission service.

5. A centralized interworking function (CIWF) as claimed in claim 2, characterized in that the at least one interworking function (IWF1) adapts data signals to be transmitted between the mobile radio network (MRS) and the telecommunications network (TN) to the different communication protocols and transmission rates specified for the provision of a data transmission service.

6. A centralized interworking function (CIWF) as claimed in claim 1, characterized in that to establish and release a connection between any of the mobile switching centers (MSC) and any of the different interworking functions (IWF1), the at least one control unit (SC) connected to the switching network (SWT) receives and evaluates a signaling message from the respective mobile switching center (MSC).

7. A centralized interworking function as claimed in claim 1, characterized in that at least one of the interworking functions (IWF1) comprises a modem.

8. A centralized interworking function as claimed in claim 1, characterized by said centralized interworking function forming part of one of the mobile switching centers.

9. A mobile radio network (MRS) comprising a centralized interworking function (CIWF) containing different interworking functions (IWF1 to IWFn) for providing interworking between the mobile radio network (MRS) and different data transmission nodes (MOD, PAD, PH, ISDN) of a telecommunications network (TN), said centralized interworking function (CIWF) being connected to a number of mobile switching centers (MRS) which establish data links (DATA) between the mobile radio network (MRS) and the telecommunications network (TN), wherein the centralized interworking function (CIWF) makes available, to a subscriber, conversion between a mobile radio protocol and an analog modulation (MOD) protocol, between a mobile radio protocol and a packet assembler/disassembler (PAD) protocol, between a mobile radio protocol and a packet handler (PH) protocol, and between a mobile radio protocol and an Integrated Services Digital Network (ISDN) protocol, by means of a switching network (SWT) and at least one control unit (SC) connected thereto, which permit any of the interworking functions (IWF1 to IWFn) to be connected to any of the mobile switching centers (MSC) so as to selectively interpose individual ones of the interworking functions in individual ones of the data links (DATA).

\* \* \* \* \*